United States Patent
Liverance et al.

(12)

(10) Patent No.: US 10,853,302 B2
(45) Date of Patent: *Dec. 1, 2020

(54) DATA ROUTING BY A DRIVER INSTALLED FROM A COMPUTING DEVICE

(71) Applicant: HEWLETT-PACKARD DEVELOPMENT COMPANY, L.P., Spring, TX (US)

(72) Inventors: Fletcher Liverance, Kent, OH (US); Thomas J. Flynn, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,953

(22) Filed: Aug. 14, 2019

(65) Prior Publication Data

US 2019/0370210 A1    Dec. 5, 2019

Related U.S. Application Data

(63) Continuation of application No. 14/787,999, filed as application No. PCT/US2013/049216 on Jul. 3, 2013, now Pat. No. 10,423,564.

(51) Int. Cl.
*G06F 13/20* (2006.01)
*G06F 13/42* (2006.01)
(Continued)

(52) U.S. Cl.
CPC ........ *G06F 13/4282* (2013.01); *G06F 13/385* (2013.01); *G06F 13/4022* (2013.01); *G06F 13/4027* (2013.01); *Y02D 10/00* (2018.01)

(58) Field of Classification Search
None
See application file for complete search history.

(56) References Cited

U.S. PATENT DOCUMENTS 5,745,785 A * 4/1998 Shoji ..................... G06F 3/0601
710/7
6,867,882 B1    3/2005 Takahashi
(Continued)

FOREIGN PATENT DOCUMENTS

CN            1804820 A        7/2006
KR    10-2013-0078473         7/2013
(Continued)

OTHER PUBLICATIONS

European Patent Office, Extended European Search Report for Appl. No. 13888866.4 dated Jan. 25, 2017 (6 pages).
(Continued)

*Primary Examiner* — Henry Tsai
*Assistant Examiner* — Dean Phan
(74) *Attorney, Agent, or Firm* — Trop Pruner & Hu PC

(57) ABSTRACT

In some examples, a first computing device installs a driver from a memory of a second computing device into the first computing device, the second computing device physically connected to the first computing device at a first interface. In response to user interaction with machine-readable instructions executed on the first computing device, the machine-readable instructions access an operating system session of an operating system executed on the second computing device while physically connected to the first computing device at the first interface. The driver receives data from the operating system session of the operating system executed on the second computing device, and routes the data to a peripheral device connected to the first computing device at a second interface.

18 Claims, 4 Drawing Sheets

(51) Int. Cl.
*G06F 13/40* (2006.01)
*G06F 13/38* (2006.01)

(56) References Cited

U.S. PATENT DOCUMENTS

| | | |
|---|---|---|
| 8,341,087 B2 | 12/2012 | Lee |
| 8,429,678 B1* | 4/2013 | Parthiban |
| 2002/0051259 A1* | 5/2002 | Yasunobu ................ H04N 1/46 358/518 |
| 2002/0184040 A1* | 12/2002 | Okano ...................... G06F 3/08 704/500 |
| 2004/0199909 A1* | 10/2004 | Goodman ............. G06F 13/385 717/168 |
| 2005/0030584 A1 | 2/2005 | Tanaka |
| 2005/0037807 A1 | 2/2005 | Dove |
| 2005/0216639 A1 | 9/2005 | Sparer |
| 2006/0123129 A1 | 6/2006 | Toebes et al. |
| 2006/0161617 A1 | 7/2006 | Zhong et al. |
| 2008/0028120 A1 | 1/2008 | McLeod |
| 2008/0052770 A1* | 2/2008 | Ali ......................... G06F 21/34 726/9 |
| 2008/0141042 A1* | 6/2008 | Lo .......................... G06F 21/10 713/193 |
| 2008/0215795 A1 | 9/2008 | Ishii |
| 2008/0307123 A1 | 12/2008 | Cheng |
| 2011/0138013 A1 | 6/2011 | Zhong et al. |
| 2011/0231539 A1 | 9/2011 | Bhesania et al. |
| 2012/0083212 A1 | 4/2012 | Yen et al. |
| 2012/0158822 A1 | 6/2012 | Dai et al. |
| 2012/0246359 A1 | 9/2012 | Scragg, Jr. et al. |
| 2014/0250239 A1 | 9/2014 | Lambert |

FOREIGN PATENT DOCUMENTS

| | | |
|---|---|---|
| TW | 200844755 A | 11/2008 |
| TW | 200849019 A | 12/2008 |
| TW | 201214101 A | 4/2012 |
| WO | WO-2007121344 | 10/2007 |

OTHER PUBLICATIONS

PCT Search Report/Written Opinion ~ Application No. PCT/US2013/049216 dated Mar. 27, 2014 ~ 9 pages.

What is USB for Remote Desktop, (Web Page), 2000; 3 pages. Available at: <http://www.usb-over-network.com/usb-for-remote-desktop.html>.

* cited by examiner

DATA ROUTING BY A DRIVER INSTALLED FROM A COMPUTING DEVICE

CROSS REFERENCE TO RELATED APPLICATIONS

This is a continuation of U.S. application Ser. No. 14/787,999, having a national entry date of Oct. 29, 2015, which is a national stage application under 35 U.S.C. § 371 of PCT/US2013/049216, filed Jul. 3, 2013, which are both hereby incorporated by reference in their entirety.

BACKGROUND

Users of computer systems may desire to use their own device on another's network, such as an employer's network. For example, a user may wish to use his own computing device, such as a laptop, tablet, etc., to connect securely to his employer's network, either at work or from a remote location.

BRIEF DESCRIPTION OF THE DRAWINGS

The following detailed description references the drawings, in which.

DETAILED DESCRIPTION

Figure 1:
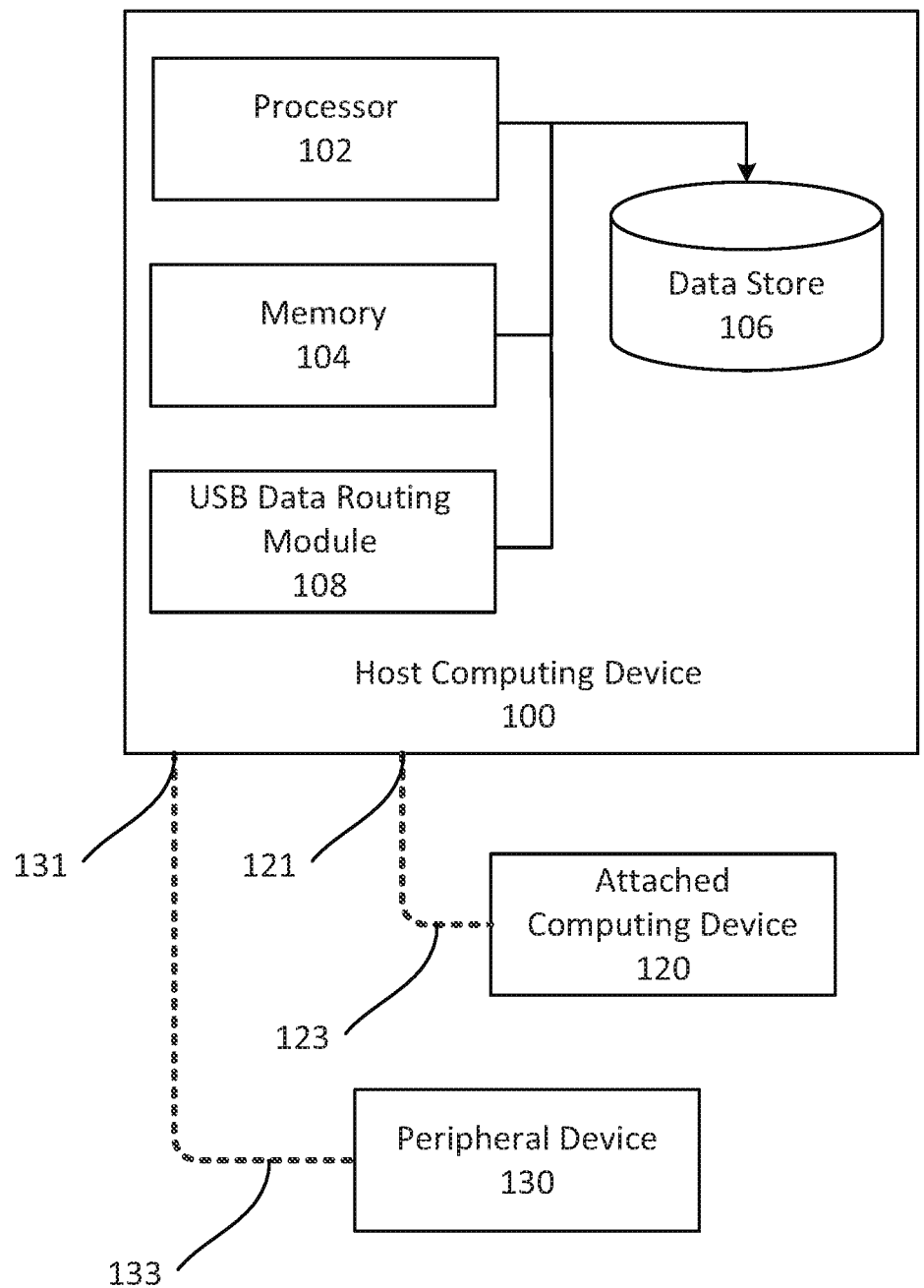
FIG. 1 illustrates a block diagram of a host computing device to route USB data between an attached computing device and a peripheral device according to examples of the present disclosure.

A user wishing to remotely access a network such as the user's employer's network may utilize a specialized computing device, such as a computing device on a USB stick, connected to the user's own computing device. While using the computing device on the USB stick, the user may wish to access a peripheral device connected to the user's own computing device.

A user of a computing device may desire to connect a specialized computing device for accessing a remote network. For example, a user may desire to access the user's employer's network from a remote location or from the user's own device. To do so, the user may attach a specialized computing device in the form of a small device such as a universal serial bus (USB) device to the user's computer. This specialized or attached computing device may attach to a host computing device, the attached computing device enabling the user to access a dedicated computing environment on the attached computing device via the host computing device. Once the user attaches the attached computing device to the host computing device, the attached computing device may boot up and load an operating system on the attached computing device. The user may then access the operating system on the attached computing device through the host computer through a web browser, for example.

However, the user may be unable to access any peripheral devices connected to the host computing device by USB from the operating system session running on the attached computing device. For instance, the user may desire to print a document on a printer connected to the host computing device from the operating system session running on the attached computing device. In fact, the attached computing device may be unaware that the host computing device has any attached peripheral devices, so the operating system session running on the attached computing device cannot access those attached peripheral devices.

Previously, the host computing device may have utilized a custom USB driver and a proprietary protocol to decode and re-encode the USB message between the attached computing device and the peripheral device. This process involves the operating system installed and running on the host computing device to receive, decode, re-encode, and retransmit the data. In this scenario, the host computing device may receive data via a USB communication link from the attached computing device to be sent to a peripheral device connected to the host computing device. The host computing device would receive the data, decode the data, segment the data into packets, re-encode the data, and then transmit the data to the peripheral device. The peripheral device may then receive the data, decode the data, and process the data in the usual way.

Similarly, for data being sent from the peripheral to the attached computing device, the host computing device may receive the data, decode the data, segment the data into packets, re-encode the data, and then transmit the data to the peripheral device over a network protocol such as TCP/IP or UDP and then re-assemble the USB data and insert them back into the USB bus protocol message queue of the attached computing device. The attached computing device may then process the data in the usual way.

Previous methods have the disadvantage of not directly using the USB messages. Moreover, all USB messages needed to be encoded, transmitted, decoded, causing problems with isochronous devices and high bandwidth devices such as smart cards, web cameras, and imaging devices.

Various examples will be described below by referring to several examples of universal serial bus (USB) data routing, including USB data routing by the host computing device between the attached computing device and peripheral devices connected to the host computing device. The USB data routing disclosed herein utilizes a special USB driver installed on the host computing device that enables the sharing of USB messages between the host computing device and the attached computing device so that the attached computing device may access and control peripheral devices attached to the same USB bus without needing higher level device control, such as involvement by the host computing device's operating system.

In some implementations, USB messages need not be broken apart, encoded into packets, transmitted via a higher level network protocol (such as TCP/IP or UDP), and then decoded, reassembled, and processed. The overhead resulting from the prior process may cause issues with timing and may add significant complexity, as USB messages were never designed or intended to be broken into packets. The examples described herein avoid unnecessary overhead of USB message encoding, packeting, and transmitting by directly transmitting the USB messages between the attached computing device and a peripheral device attached to the host computing device using existing USB infrastructure and interface. These and other advantages will be apparent from the description that follows.

FIG. 1 illustrates a block diagram of a host computing device 100 to route USB data between an attached computing device 120 and a peripheral device 130 according to examples of the present disclosure. It should be understood that the host computing device may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like.

The host computing device 100 may include a processor 102 that may be configured to process and execute instructions. The processor 102 may be any appropriate type of processor or microprocessor, including an ARM processor or other type of RISC-based processor, or the processor 102 may include a general purpose processor or specialized processor.

The instructions may be stored on a non-transitory tangible computer-readable storage medium, such as memory device 104, or on a separate device (not shown), or on any other type of volatile or non-volatile memory that stores instructions to cause a programmable processor to perform the techniques described herein. Alternatively or additionally, the host computing device 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

In some examples, such as shown in FIG. 1, a data store 106 may be included in the host computing device 100, which may be used to store data. The data may include, for example an operating system, a device driver or drivers, and/or other appropriate data. The data store 106 may be a hard disk drive, a flash memory device, a read-only memory device, a random access memory device, or another suitable device for storing data. The data store 106 may also store applications or programs which may be launched and used by a user of the host computing device 100. Multiple data stores (of the same or different types) may be utilized in other examples.

The host computing device 100 may also include a USB data routing module 108 for routing USB data between USB attached USB devices. In one example, the USB data routing module 108 may route USB data between an attached computing device 120 and a peripheral device 130. In other examples, the USB data routing module 108 may route USB data between and among a variety of other devices attached or communicatively coupled to the host computing device 100.

In one example, the USB data routing module 108 may be a dedicated hardware component such as a modified USB controller chipset. However, in another example, the USB data routing module may be integrated into the USB host controller firmware or in the USB driver installed on the operating system of the host computing device 200.

The USB data routing module 108 may enable the host computing device to route USB traffic between and among the attached computing device 120 and the peripheral device 130, for example, without the assistance of an application layer on the host computing device 100. Rather, the USB data routing module 108 may process and route USB data between the attached computing device 120 and the peripheral device 130 at the hardware level. In this scenario, the USB data does not need to be decoded, broken into packets, re-encoded, and then retransmitted. Additionally, because the USB data may be sent as a single USB message instead of multiple packets of a broken apart USB message, the receiving device (for example, the peripheral device 130 if the attached computing device 120 is the sending device) need not re-assemble the packets. In this way, less latency will occur during the dating sending process. Moreover, as the USB data messages are sent as a whole, there is a decreased chance that an individual packet of a segmented message may be lost.

A user of the host computing device 100, which may be a typical user or an administrative user, or the host computing device 100 manufacturer, may have some control over the USB data routing module. For instance, the appropriate party may choose which messages, and which devices, should be routed to the attached computing device 120 instead of to the host computing device 100. Additionally, this behavior may be modified while the devices are attached and communicating without resetting or unplugging any of the devices, in one example.

The attached computing device 120 may be a device attached to the host computing device 100 that enables a user to initiate an operating system environment, such as a remote session through remote desktop protocol, Citrix, virtual machine, or the like. For example, a user of the host computing device may attach the attached computing device 120 to a USB port 121. In this way, a USB connection 123 is formed between the attached computing device 120 and the host computing device 100. The USB connection 123 may transmit data between the host computing device 100 and the attached computing device 120. Data may be sent from the host computing device 100 to the attached computing device 120 via the USB connection 123. Similarly, data may be sent from the attached computing device 120 to the host computing device 100 via the USB connection 123. The USB connection may include a physical cable, series of cables, and/or a USB hub or other suitable connection, or the attached computing device maybe directly attached to the USB port 121 of the host computing device 100. The USB port 121 and the USB port 131 may be on the same or different USB controllers within the computing device 100. Moreover, the USB ports 121 and 131 may be connected to different types of USB controllers such as USB 1.0, 1.1, 2.0, and/or 3.0. The host computing device 100 may install a module on each controller, enabling the different controllers to communicate. In another example, the operating system of the host computing device 100 may manage the USB controllers.

The peripheral device 130 may include a variety of different peripheral devices attached and/or communicatively coupled to the host computing device 100. For instance, the peripheral device 130 may be a printer attached to the host computing device 100. The peripheral device 130 may also be an imaging device such as a web camera or scanner, an external data storage device, a smart card, a security access device, or any number of a variety of suitable peripheral devices.

The peripheral device 130 may be attached and/or communicatively coupled to the host computing device 100 by a USB connection 133 at a USB interface port 131 of the host computing device. The USB connection 133 may transmit data between the host computing device 100 and the peripheral device 130. Data may be sent from the host computing device 100 to the peripheral device 130 via the USB connection 133. Similarly, data may be sent from the peripheral device 130 to the host computing device 100 via the USB connection 133. The USB connection may include a physical cable, series of cables, and/or a USB hub or other suitable connection, or the attached computing device maybe directly attached to the USB port 121 of the host computing device 100.

In one example, USB data may be sent from the attached computing device 120 via the USB connection 123 and may be received at the USB port 121 of the host computing device 100. The received USB data may be processed by the USB data routing module 108 of the host computing device. In processing the USB data, the routing module 108 may determine that the USB data should be routed to another attached device such as peripheral device 130. In this case, the USB data routing module 108 may route the USB data received from the attached computing device 120 to the peripheral device via the USB connection 133 via USB port 131.

By processing and routing the data using the USB data routing module 108, the host computing device 100 need not utilize the operating system and/or application layer to route the data, saving the need to decode, disassemble the data into packets, and retransmit the data. Also, in this scenario, the peripheral device 130 may receive the sent USB data in the same form as it was sent by the attached computing device 120, thus saving time and computing power while reducing latency and errors. In another example, the host computing device 100 may utilize the operating system of the host computing device 108 to perform the USB data routing.

In one example, the USB interface port 121 and the USB connection port 131 may be on or connected to a single USB controller. In another example, the single USB controller may have additional USB interface ports. In yet another example, the USB interface port 121 may be on a different USB controller from the USB connection port 131.

Figure 2:
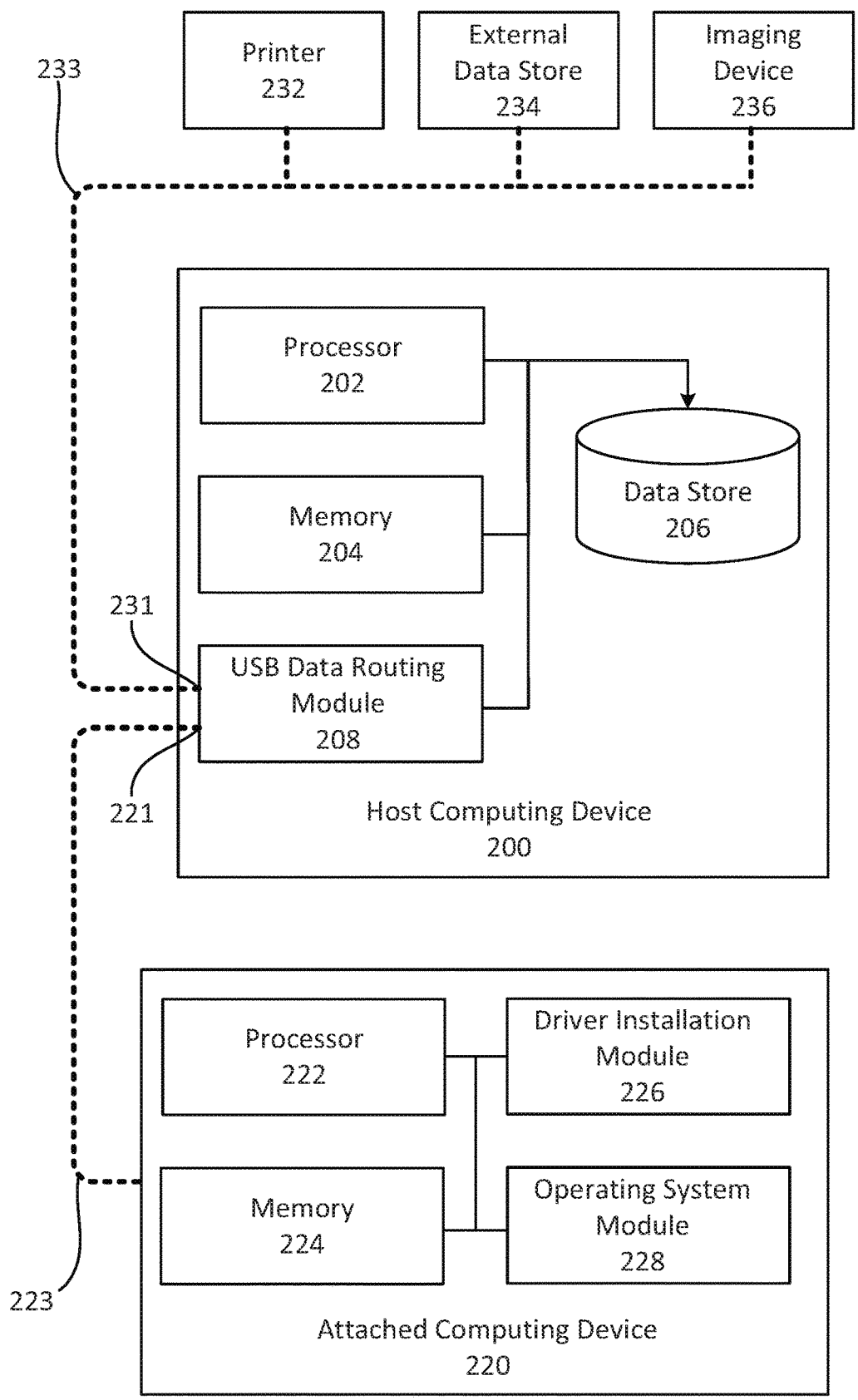
FIG. 2 illustrates a block diagram of a host computing device to route USB data between an attached computing device and a peripheral device according to examples of the present disclosure.

FIG. 2 illustrates a block diagram of a host computing device 100 to route USB data between an attached computing device 120 and a peripheral device according to examples of the present disclosure.

The host computing device 200 may include a USB data routing module 208 for routing USB data between USB attached USB devices. In one example as shown in FIG. 2, the USB data routing module 208 may route USB data between an attached computing device 220 and a peripheral device such as printer 232, external data store 234, and/or imaging device 236. In other examples, the USB data routing module 208 may route USB data between and among a variety of other devices attached or communicatively coupled to the host computing device 200.

In one example, the USB data routing module 208 may be a dedicated hardware component such as a modified USB controller chipset. However, in another example, the USB data routing module 208 may be integrated into the USB host controller firmware or in the USB driver installed on the operating system of the host computing device 200.

The USB data routing module 208 may enable the host computing device to route USB traffic between and among the attached computing device 220 and a variety of peripheral devices such as the printer 232, the external data store 234, and/or the imaging device 236 without the assistance of an application layer on the host computing device 200. Rather, the USB data routing module 208 may process and route USB data between the attached computing device 220 and one or more of the peripheral devices, including the printer 232, the external data store 234, and/or the imaging device 236, at the hardware level. In this scenario, the USB data does not need to be decoded, broken into packets, re-encoded, and then retransmitted. Additionally, because the USB data may be sent as a single USB message instead of multiple packets of a broken apart USB message, the receiving device (for example, the printer 232 if the attached computing device 220 is the sending device) need not re-assemble the packets. In this way, less latency will occur during the dating sending process. Moreover, as the USB data messages are sent as a whole, there is a decreased chance that an individual packet of a segmented message may be lost.

The attached computing device 220 shown in FIG. 2 may include a processor 222 for executing instructions, a memory 224 for storing instructions, a driver installation module 226 for causing a USB device driver for routing the USB data within the host computing device 200 to be installed or updated on the host computing device, and a operating system module 228 for initiating an operating system session on the host computing device 200.

A network interface (not shown) may also be included in the host computing device 200. The network interface may be any suitable type of network interface card such as wireless or wired network interface card. For example, the network interface may be a wireless network card configured to operate under the 802.11 standard using radio frequencies. The network interface may also be a wired network interface card configured to connect via a wire to a network, such as through an Ethernet connection. A variety of other network interfaces may be used in differing examples, including Bluetooth, WLAN, near field communications, RF, or any other suitable type of wired or wireless network interfaces.

The attached computing device 220 may include a driver installation module in one example. The driver installation module may be stored in the memory 224, may execute on the processor 222 and may cause a USB device driver for routing the USB data within the host computing device 200 to be installed or updated on the host computing device. In one example, prior to installation, the device driver may be stored in the memory 224 or, in another example, may be stored in a data store of the attached computing device 220. Multiple USB device drivers may be stored in the data store, and the correct USB device driver may be selected by the driver installation module or by a user of the host computing device.

The device driver may enable the host computing device 200 to route USB traffic between and among the attached computing device 220 and a peripheral device without the assistance of an application layer on the host computing device 200.

A driver installation module 226 also be included in the attached computing device 220 and may cause the host computing device 200 to install the USB device driver for routing USB messages. For example, if the host computing device 200 is already powered on when the computing device is attached to the host computing device, the host computing device 200 may automatically be triggered. In this case, the driver installation module 226 may pass or communicate the USB device driver to the host computing device 200, along with a command (or set of commands) to cause the host computing device 200 to install the device driver. The driver installation module 226 may also be triggered manually such as through a physical button press, through a command entered at a command prompt, or through a selection on a user interface.

In one example, the host computing device 200 may prompt a user of the host computing device 200 to allow or accept the USB device driver installation. The host computing device 200 may also install the USB device driver without input from the user and/or without the user's knowledge, in another example. Once the USB device driver is installed on the host computing device, the host computing device 200 may route USB messages between and among an attached computing device and one or more peripheral devices.

The attached computing device 220 may also include an operating system module 220, which may initiate an operating system session on the host computing device 200. For example, the operating system module 220 may cause an operating system (e.g., Linux, Microsoft Windows, Android OS, Apple iOS, etc.) to boot up and initiate on the attached computing device 220. This may include loading the relevant operating system software and/or drivers necessary to initiate the operating system session on the attached computing device 220. The operating system session may be loaded into the memory 224 and may be executed on the processor 222. The operating system module 228 may begin initiating the operating system upon the attached computing device 220 being attached to the host computing device 200 (if the host computing device is already powered on) or may begin once the host computing device 200 is turned on (if the attached computing device 220 is already attached to the host computing device).

Once the operating system is initiated, the attached computing device 220 may cause the host computing device to launch a web browser interface on the host computing device's 200 user interface. A user may also manually launch the web browser interface on the host computing device 200 via its user interface. The web browser interface may connect to the attached computing device 220 via a USB communications link 223 established between the attached computing device 220 and the host computing device 200, for example, via connection port 221.

The attached computing device 220 and the host computing device 200 may communicate over the communications link using a variety of application layer communication types as well as through other layers. For example, the devices may communicate using hypertext transfer protocol (unsecured or secured) in the application layer. Additionally, the attached computing device 220 may communicate with the host computing device 200 in at the hardware layer by sending and receiving USB messages via USB communications link 223, to be received by the host computing device 200 at USB port 221. In one example, these USB data messages may not be processed by the host computing device's 200 operating system in the application layer. Instead, the USB data routing module 208 may process and route the USB data messages at the hardware level. However, in another example, the host computing device 100 may utilize the operating system of the host computing device 108 to perform the USB data routing.

Similarly, data sent to or from a peripheral device, such as the printer 232, the external data store 234, and/or the imaging device 236 may be processed by the host computing device's 200 USB data routing module 208 instead of (or in addition to) being processed by the host computing device's 200 operating system in the application layer.

The host computing device 200 illustrated in FIG. 2 may be configured to process instructions on the processor 200, and the instructions may be stored in a non-transitory tangible computer-readable storage medium, such as the memory 204, or on a separate device (not shown), or on any other type of volatile or non-volatile memory that stores instructions to cause a programmable processor to perform the techniques described herein.

For example, the instructions may cause the processor 202 to perform at least the following functions: receive a USB data message from an attached computing device 220 communicatively coupled to the host computing device 200 at a first USB interface 221; route the USB data message received from the attached computing device 220 at the first USB interface 221 to a peripheral device (e.g., printer 232, external data store 234, and imaging device 236) communicatively coupled to the host computing device 200 at a second USB interface 231; receive a USB data message from the peripheral device via the second USB interface 231; and route the USB data message received from the peripheral device via the second USB interface 231 to the attached computing device 220 via the first USB interface 221. In one example, the instructions may also cause the processor 200 to cause the host computing device 200 to install a USB data routing module 208 on the host computing system 200.

Figure 3:
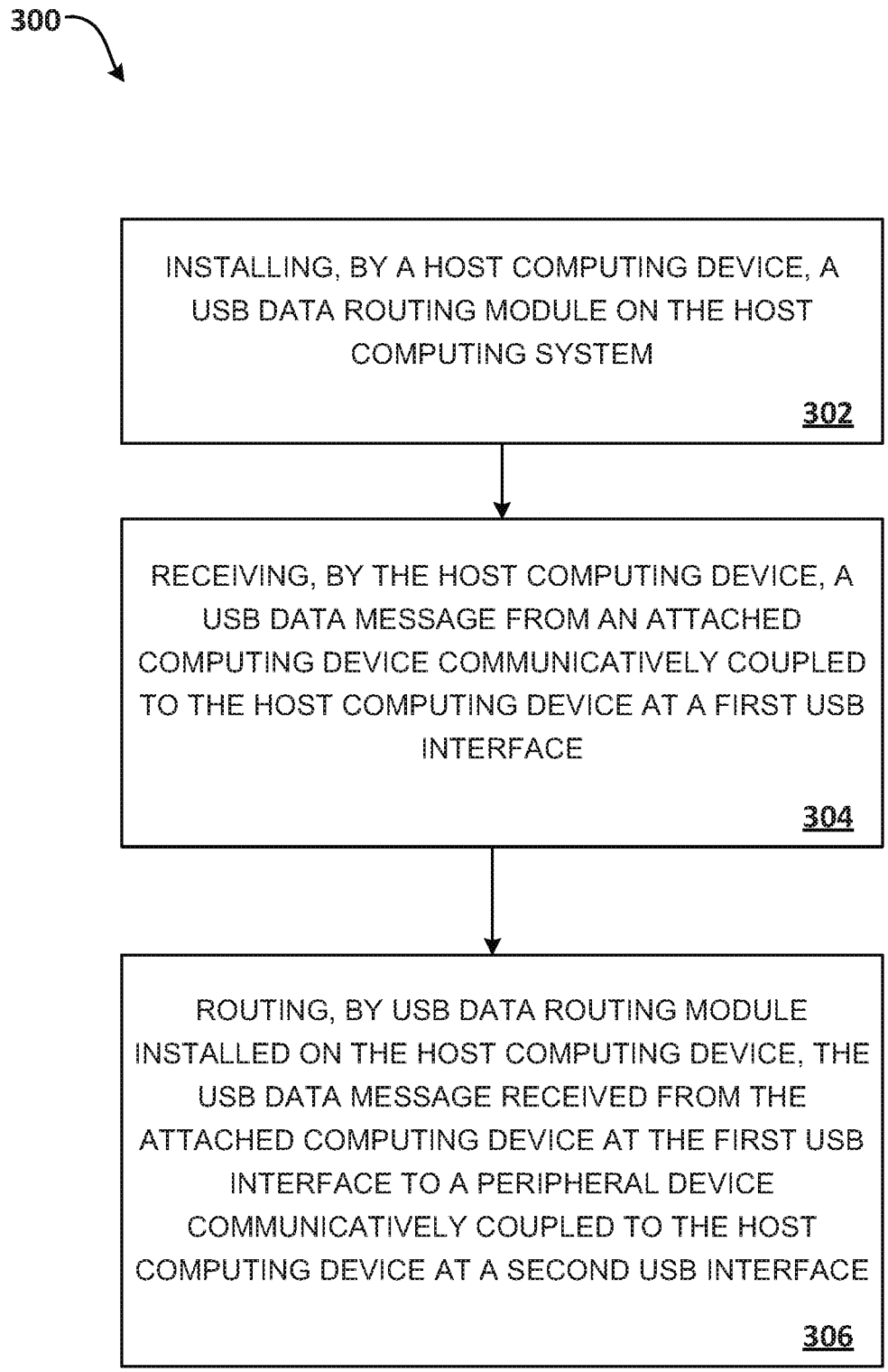
FIG. 3 illustrates a flow diagram of a method 300 for routing USB data between an attached computing device and a peripheral device through a host computing device according to examples of the present disclosure.

FIG. 3 illustrates a flow diagram of a method 300 for routing USB data between an attached computing device and a peripheral device through a host computing device according to examples of the present disclosure. The method may be performed, for example, by the computing devices 100 and 200 shown in FIGS. 1 and 2 respectively, or by another similarly suited device.

The method 300 may include at least: installing, by a host computing device, a USB data routing module on the host computing system (block 302); receiving, by the host computing device, a USB data message from an attached computing device communicatively coupled to the host computing device at a first USB interface (block 304); and routing, by USB data routing module installed on the host computing device, the USB data message received from the attached computing device at the first USB interface to a peripheral device communicatively coupled to the host computing device at a second USB interface (block 306).

In the example shown, at block 302, the method 300 may include installing, by a host computing device, a USB data routing module on the host computing system. In another example, the installing may be triggered by an attached computing device. In this case, the attached computing device may include a USB data routing module installation package which may be installed on the host computing device.

In one example, installing the USB data routing module on the host computing system may include modifying an existing USB module on the host computing system to include the USB data routing module. If the host computing device already includes a USB module, the method 300 may detect the existence of an existing USB module and determine whether the existing module includes the relevant USB data routing module functionality. If not, the correct USB data routing module may be installed or updated. The flow may then continue to block 304.

At block 304, the method 300 may include receiving, by the host computing device, a USB data message from an attached computing device communicatively coupled to the host computing device at a first USB interface. The attached computing device may send a USB data message (e.g., a command to print a document), for example, intended to be received by a peripheral device such as a printer. In this case, the host computing device receives the USB data message at the first USB interface. The flow may then continue to block 306.

At block 306, the method 300 may include routing, by USB data routing module installed on the host computing device, the USB data message received from the attached computing device at the first USB interface to a peripheral device communicatively coupled to the host computing device at a second USB interface. In the above example where a USB data message is sent from the attached computing device and is intended to be received by the peripheral device (such as a printer), the host computing device may route the USB data message to the peripheral device.

The host computing device may route the USB data message using the USB data routing module installed on the host computing device. In this case, the USB data routing module performs all the routing functions without the involvement of any application layer or operating system assistance, such as encoding, decoding, packetizing, etc. All of the routing functionality may occur in the hardware layer of the host computing device.

Additional processes also may be included, and it should be understood that the processes depicted in FIG. 3 represent generalized illustrations, and that other processes may be added or existing processes may be removed, modified, or rearranged without departing from the scope and spirit of the present disclosure.

For example, the method 300 may include receiving, by the host computing device, a USB data message from the peripheral device via the second USB interface. The method 300 may also include routing, by USB data routing module installed on the host computing device, the USB data message received from the peripheral device via the second USB interface to the attached computing device via the first USB interface. These two steps can be performed in response to receiving a USB data message from the attached computing device, or can be initiated independently.

Figure 4:
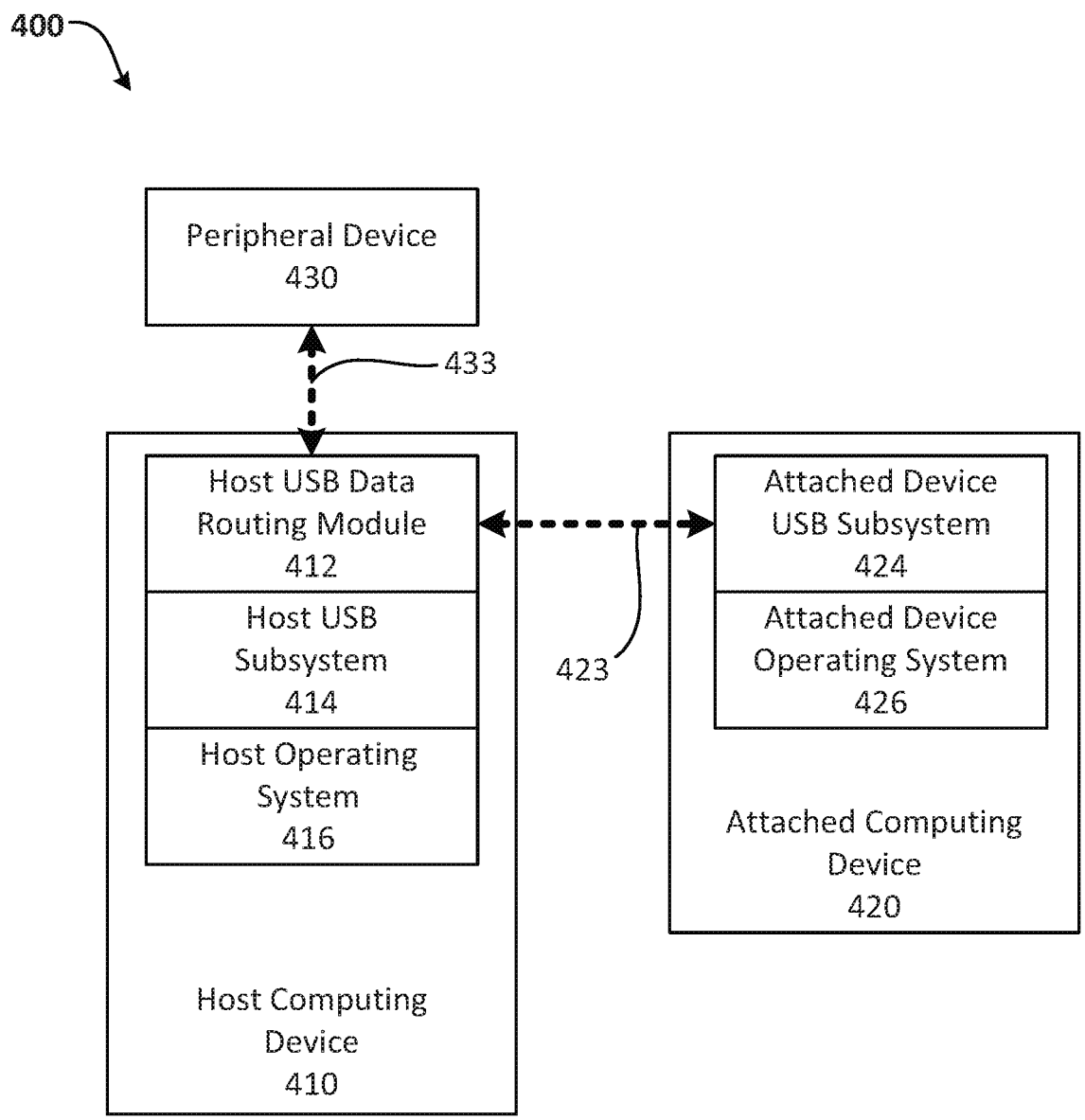
FIG. 4 illustrates a block diagram of USB data routing between a host computing device, an attached computing device, and a peripheral device.

FIG. 4 illustrates a block diagram 400 of USB data routing between a host computing device 410, an attached computing device 420, and a peripheral device 430. In this example, the block diagram 400 shows the routing of the USB data flow from the peripheral device 430 through the host USB data routing module 412 to the attached device USB subsystem 424. Of course, the USB data may flow in the opposite order, from the attached device USB subsystem 424 through the host USB data routing module 412 to the peripheral device 430.

The host computing device 410 may include a host USB data routing module 412, a host USB subsystem 414, and host operating system 416. The host USB subsystem 414 and the host operating system 416 enable the host computing device to interact with the attached peripheral device 430 and/o the attached computing device 420. However, as the flow shows, these two modules are unnecessary for the attached computing device 420 and the peripheral device 430 to exchange data via USB communication links 423 and 433.

Similarly, the attached computing device 420 may include an attached device USB subsystem 424 and an attached device operating system 426. The attached device USB subsystem communicates directly with the host USB data routing module to exchange USB data without involving the host USB subsystem 414 or the host operating system 416.

It should be emphasized that the above-described examples are merely possible examples of implementations and set forth for a clear understanding of the present disclosure. Many variations and modifications may be made to the above-described examples without departing substantially from the spirit and principles of the present disclosure.

Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method comprising:
   installing, by a first computing device, a driver from a memory of a second computing device into the first computing device, the second computing device physically connected to the first computing device at a first Universal Serial Bus (USB) port, and the first computing device comprising a program launchable and useable by a user of the first computing device, wherein the installing of the driver is in response to a command received by the first computing device from the second computing device;
   in response to a user interaction with machine-readable instructions executed on the first computing device, accessing, by the machine-readable instructions, an operating system session of an operating system executed on the second computing device while physically connected to the first computing device at the first USB port;
   receiving, by the driver executed in the first computing device and installed from the memory of the second computing device, data from the operating system session of the operating system executed on the second computing device; and
   routing, by the driver executed in the first computing device, the data received from the second computing device at the first USB port to a peripheral device connected to the first computing device at a second USB port.

2. The method of claim 1, wherein the installing of the driver on the first computing device includes modifying an existing driver on the first computing device to include the driver.

3. The method of claim 1, wherein the installing of the driver on the first computing device is triggered by an installation module executed by the second computing device communicatively coupled to the first computing device through the first USB port, the installation module executed by the second computing device sending the driver and the command to the first computing device.

4. The method of claim 1, further comprising:
   receiving, by the driver executed in the first computing device, a data message from the peripheral device via the second USB port.

5. The method of claim 4, further comprising:
   routing, by the driver executed in the first computing device, the data message received from the peripheral device via the second USB port to the second computing device via the first USB port.

6. The method of claim 1, wherein the machine-readable instructions comprise a web browser, the method further comprising:
   launching, at the first computing device, the web browser to communicate with the operating system session initiated by the operating system executed on the second computing device, the web browser allowing the user to access the operating system session on the second computing device.

7. The method of claim 1, wherein the data comprises a data message, and wherein the routing of the data message from the first USB port to the second USB port is performed without breaking apart the data message.

8. The method of claim 1, wherein the data routed from the first USB port to the second USB port remains in a same format and is unchanged by the first computing device.

9. A first computing device comprising:
a processor;
a memory;
a first Universal Serial Bus (USB) port to communicatively couple and physically connect to a second computing device;
a second USB port to communicatively couple a peripheral device to the first computing device;
a storage medium storing a program launchable and useable by a user of the first computing device, and storing machine-readable instructions executable on the processor to:
in response to a user interaction with the machine-readable instructions, access an operating system session of an operating system executed on the second computing device while physically connected to the first computing device at the first USB port, and
install a driver in the memory based on receiving, in the first computing device, a command and the driver from a memory in the second computing device, wherein the command from the second computing device is to cause the installing of the driver in the memory of the first computing device, and wherein the driver is executable on the processor to route, to the peripheral device, data from the operating system session of the operating system executed on the second computing device.

10. The first computing device of claim 9, wherein the machine-readable instructions comprise a web browser executable on the processor to access the operating system session of the operating system executed on the second computing device in response to input of the user of the first computing device.

11. The first computing device of claim 9, wherein the driver is executable on the processor to route the data from the first USB port to the second USB port, and wherein the data routed from the first USB port to the second USB port remains in a same format and is unchanged by the first computing device.

12. The first computing device of claim 9, wherein the first USB port and the second USB port are communicatively coupled to a single interface controller.

13. The first computing device of claim 9, wherein the data comprises a data message, and the driver is executable on the processor to route the data message from the first USB port to the second USB port without breaking apart the data message.

14. A non-transitory computer-readable storage medium storing instructions that when executed cause a first computing device to:
install, in the first computing device, a driver from a memory of a second computing device physically connected to the first computing device at a first Universal Serial Bus (USB) port, wherein the installing of the driver from the memory of the second computing device on the first computing device is in response to a command received by the first computing device from the second computing device;
in response to a user interaction with a web browser executed on the first computing device, access, by the web browser, an operating system session of an operating system executed on the second computing device while physically connected to the first computing device at the first USB port;
receive, at the first USB port, a first data message from the operating system session of the operating system executed on the second computing device;
route, by the driver executed in the first computing device and installed from the memory of the second computing device, the first data message received from the second computing device at the first USB port to a peripheral device connected to the first computing device at a second USB port;
receive a second data message from the peripheral device at the second USB port; and
route, by the driver executed in the first computing device, the second data message to the second computing device via the first USB port.

15. The non-transitory computer-readable storage medium of claim 14, further comprising instructions that when executed cause the first computing device to:
install the driver on the first computing device by installing the driver from the memory of the second computing device to a memory of the first computing device.

16. The non-transitory computer-readable storage medium of claim 14, wherein the routing of the first data message from the first USB port to the second USB port is performed without breaking apart the first data message.

17. The non-transitory computer-readable storage medium of claim 14, wherein the installing of the driver on the first computing device is triggered by an installation module executed by the second computing device communicatively coupled to the first computing device, the installation module to send the driver and the command to the first computing device.

18. The first computing device of claim 9, wherein the machine-readable instructions are executable on the processor to receive the driver and the command from an installation module executed by the second computing device.

* * * * *